(12) United States Patent
Odeh et al.

(10) Patent No.: US 12,187,102 B2
(45) Date of Patent: Jan. 7, 2025

(54) RUN CHANNEL WITH ADHESIVE WEAR TAPE

(71) Applicant: Toyoda Gosei Co., Ltd., Kiyosu (JP)

(72) Inventors: Abdullah Odeh, Windsor (CA); Travis Langton, Saint Clair Shores, MI (US); Timothy Wilson, Birmingham, MI (US)

(73) Assignee: Toyoda Gosei Co., Ltd., Kiyosu (JP)

( * ) Notice: Subject to any disclaimer, the term of this patent is extended or adjusted under 35 U.S.C. 154(b) by 443 days.

(21) Appl. No.: 17/577,646

(22) Filed: Jan. 18, 2022

(65) Prior Publication Data

US 2023/0226897 A1  Jul. 20, 2023

(51) Int. Cl.
  *B60J 10/76* (2016.01)
  *B29C 45/00* (2006.01)
  *B60J 10/35* (2016.01)
  *B29L 31/26* (2006.01)
  *B29L 31/30* (2006.01)

(52) U.S. Cl.
  CPC ........... *B60J 10/76* (2016.02); *B29C 45/0081* (2013.01); *B60J 10/35* (2016.02); *B29L 2031/265* (2013.01); *B29L 2031/30* (2013.01)

(58) Field of Classification Search
  CPC ... B60J 10/76; B60J 10/35; B60J 10/21; B60J 1/007; B60J 1/17; B60J 1/1861; B60J 5/0402; B29C 45/0081; B29L 2031/265; B29L 2031/30
  See application file for complete search history.

(56) References Cited

U.S. PATENT DOCUMENTS

| | | | | |
|---|---|---|---|---|
| 7,685,777 | B2 * | 3/2010 | Nozaki | B60J 10/24 49/490.1 |
| 2005/0235573 | A1 * | 10/2005 | Roush | B60J 10/80 49/493.1 |
| 2007/0024084 | A1 * | 2/2007 | Oba | B60J 10/40 49/475.1 |
| 2007/0068085 | A1 * | 3/2007 | Ninomiya | B60J 10/16 49/489.1 |
| 2012/0137593 | A1 * | 6/2012 | Cicala | E05D 15/0652 49/428 |
| 2013/0074417 | A1 * | 3/2013 | Kawai | B60J 10/87 49/490.1 |
| 2013/0232881 | A1 * | 9/2013 | Adachi | B60J 10/16 49/490.1 |
| 2017/0077662 | A1 * | 3/2017 | Cruz | H02G 3/04 |
| 2017/0106573 | A1 * | 4/2017 | Kawaguchi | B29C 45/14065 |

* cited by examiner

*Primary Examiner* — Amy R Weisberg
*Assistant Examiner* — Sara Laghlam
(74) *Attorney, Agent, or Firm* — Christopher G. Darrow; Darrow Mustafa PC

(57) ABSTRACT

A run channel for a vehicular door includes a corner section and adhesive wear tape. The corner section includes window surfaces facing interiorly to the corner section, door structure surfaces facing exteriorly to the corner section, and a wear spot on a door structure surface. The adhesive wear tape is applied to the wear spot, and includes a backing configured to shield the wear spot from wear.

20 Claims, 3 Drawing Sheets

RUN CHANNEL WITH ADHESIVE WEAR TAPE

TECHNICAL FIELD

The embodiments disclosed herein relate to vehicles and, more particularly, to vehicular doors equipped with run channels.

BACKGROUND

Run channels are common equipment on vehicular doors that include windows. These doors include window frames, and, as part of the window frames, door structures and run channels. From between the door structures and the windows, the run channels are configured to make seals with the peripheries of the windows, as well as slidably support the windows for movement between closed positions and open positions. Moreover, the run channels are configured to make seals with the door structures. Accordingly, together with the windows, the run channels are configured to prevent environmental conditions from entering passenger compartments either between the run channels and the peripheries of the windows or between the run channels and the door structures.

For particular features of the door structures, door structure surfaces of the run channels, and seals with the door structures, the run channels may include wear spots on the door structure surfaces opposite the features. The features, the door structure surfaces, or both may create the wear spots as the product of interference with one another. Although traditional run channels have proven satisfactory, run channel manufactures and vehicle manufactures, among others, may desire improvements for shielding the wear spots from wear by the features to eliminate the prospect of the features compromising the integrity of the seals with the door structures.

SUMMARY

Disclosed herein are embodiments of, and methods of assembling, a run channel for a vehicular door. In one aspect, a run channel for a vehicular door includes a corner section and adhesive wear tape. The corner section includes window surfaces facing interiorly to the corner section, door structure surfaces facing exteriorly to the corner section, and a wear spot on a door structure surface. The adhesive wear tape is applied to the wear spot, and includes a backing configured to shield the wear spot from wear.

In another aspect, a method of assembling a run channel for a vehicular door includes molding a corner section, and, after molding the corner section, applying adhesive wear tape. The corner section includes window surfaces facing interiorly to the corner section, door structure surfaces facing exteriorly to the corner section, and a wear spot on a door structure surface. The adhesive wear tape is applied to the wear spot, and includes a backing configured to shield the wear spot from wear.

In yet another aspect, a run channel for a vehicular door includes a corner section and adhesive wear tape. The corner section has a molded construction, and includes a base, an inner leg and an outer leg extending from the base, an inner sealing lip and an outer sealing lip extending from the inner leg and the outer leg interiorly to the corner section, a wear spot on the outer leg facing exteriorly to the corner section, and a recess molded into the wear spot. The adhesive wear tape is applied within the recess, and includes a backing configured to shield the wear spot from wear.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

With reference to a vehicular door equipped therewith and an associated door structure, this disclosure teaches a run channel that includes a corner section and adhesive wear tape. The corner section includes a wear spot on a door structure surface. The adhesive wear tape is applied to the wear spot, and includes a backing configured to shield the wear spot from wear. As explained in additional detail below, applying the adhesive wear tape to the wear spot is advantageously not only more cost-effective, but also more design-friendly, than over molding a metallic wear element or insert molding a polymeric wear element with the corner section. Moreover, the wear spot and the adhesive wear tape include features such that the adhesive wear tape may be advantageously applied to the wear spot in a design-friendly, user-friendly, error-proof, and reliable manner.

Figure 1A:
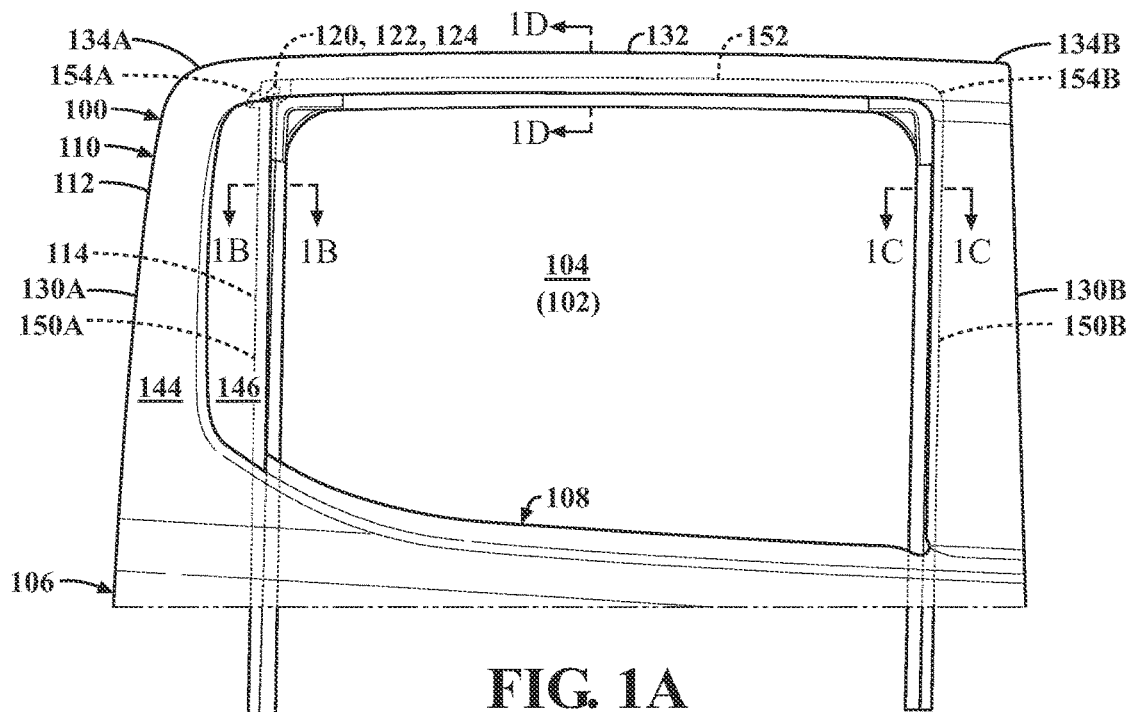
FIG. 1A is a side view of a vehicular door that includes a window, a window frame, and, as part of the window frame, a door structure and a run channel, showing, among other things, aspects of the run channel, including a first corner section with a wear spot on a door structure surface, and adhesive wear tape applied to the wear spot.

Part of a representative door 100 for a vehicle is shown in FIG. 1A. In this description, uses of "front," "forward," and the like, and uses of "rear," "rearward," and the like, refer to the corresponding longitudinal directions of the vehicle and the door 100. "Front," "forward," and the like refer to the front (fore) of the vehicle and the door 100, while "rear," "rearward," and the like refer to the back (aft) of the vehicle and the door 100. Uses of "transverse," "inner," "inward," "outer," "outward," and the like refer to the corresponding lateral directions of the vehicle and the door 100. Uses of "above," "below," and the like refer to the corresponding vertical directions of the vehicle and the door 100.

It will be understood that with a configuration typical of passenger vehicles, the vehicle will include an exterior and a number of interior compartments, including a passenger compartment. Moreover, the vehicle will include a body that forms the exterior, defines the passenger compartment, and defines a door opening that opens between the passenger compartment and the exterior. As part of the body, the door 100 will correspond to the door opening, and, in the vehicle, will serve as closure panel for the passenger compartment. The door 100 will be pivotally, slidingly, or otherwise connected to the remainder of the body for movement, relative to the door opening, between a closed position over the door opening and an open position away from the door opening.

The door 100 defines a window opening 102 and includes an upright window 104 corresponding to the window opening 102. It will be understood that in the vehicle, the window opening 102 will open between the passenger compartment and the exterior through the door 100, and the window 104 will serve as closure panel for the passenger compartment. The door 100 supports the window 104 for movement, relative to the window opening 102, between a closed position over the window opening 102 and an open position away from the window opening 102 through a range of partially-open positions. As shown, the window 104 is in the closed position.

The door 100 includes an upright main body 106, a horizontal beltline 108, and an upright window frame 110 for the window 104. In this description, uses of "outside" and "inside" refer to the radial directions of the window frame 110. The main body 106, the beltline 108, and the window frame 110 are vertically adjacent one another, with the window frame 110 above the main body 106 about the beltline 108. In addition to the window frame 110 and the window 104, the door 100 may include a window regulator for the window 104. The window regulator is housed by, mounted to, and otherwise supported by the main body 106. From within the main body 106, the window regulator is connected between the main body 106 and the window 104. The window regulator is operable to close the window 104, open the window 104, and otherwise move the window 104 between the closed position and the open position.

Figure 1D:
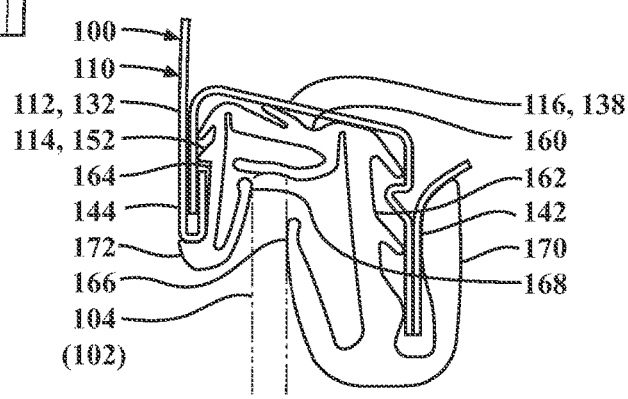
FIGS. 1B, 1C, and 1D are cross-sectional views of the window frame taken along the lines 1B-1B, 1C-1C, and 1D-1D in FIG. 1A, showing, among other things, aspects of the door structure, including an inner door panel, an outer door panel, and an applique, and aspects of the run channel, including a base, an inner leg and an outer leg, an inner sealing lip and an outer sealing lip, and an inner molding lip and an outer sealing bead.
Figures 1B, 1C:
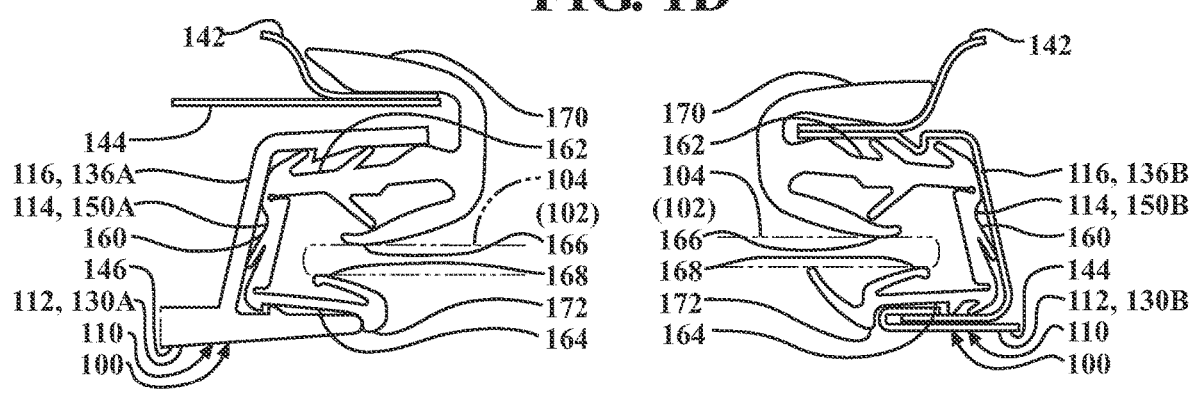

As shown with additional reference to FIGS. 1B, 1C, and 1D, as part of the window frame 110, the door 100 includes a rigid door structure 112 and a flexible run channel 114 for the window 104. Together with the beltline 108, the door structure 112 frames the window opening 102, and the run channel 114 defines the window opening 102. As part of the door structure 112, the door 100 includes an interior mounting channel 116 for the run channel 114. The mounting channel 116 extends along and is oriented with the door structure 112. The mounting channel 116 opens toward the window opening 102 and is complementary to the run channel 114. The run channel 114 extends along and is mounted to the door structure 112 within the mounting channel 116. The run channel 114 opens to the window opening 102 and is interiorly complementary to the periphery of the window 104 and exteriorly complementary to the mounting channel 116 and otherwise to the door structure 112.

From between the door structure 112 and the window 104, the run channel 114 (also referred to as various combinations of "glass," "run," "channel," and "seal," such as "glass run channel" or "glass run seal") is configured to perform support functions with respect to the window 104 and sealing functions with respect to both the window 104 and the door structure 112. In general, the run channel 114 includes a number of window surfaces and a number of door structure surfaces. The window surfaces face interiorly to the run channel 114 toward the periphery of the window 104. Using the window surfaces, the run channel 114 is configured to make seals with the periphery of the window 104. The seals with the periphery of the window 104 are resilient and slidable. Accordingly, the run channel 114 is configured to resiliently support the window 104 against vibratory normal movement about the closed position, the open position, and the partially-open positions. At the same time, the run channel 114 is configured to slidably support the window 104 for movement between the closed position and the open position. The door structure surfaces face exteriorly to the run channel 114 toward the door structure 112. Using the door structure surfaces, the run channel 114 is configured to make seals with the door structure 112.

Accordingly, together with the window 104, the run channel 114 is configured to prevent water, air, noise, and like environmental conditions from entering the vehicle. For example, by making the seals with the periphery of the window 104, the run channel 114 is configured to prevent environmental conditions from entering the passenger compartment between the run channel 114 and the periphery of the window 104. Moreover, by making the seals with the door structure 112, the run channel 114 is configured to prevent environmental conditions from entering the passenger compartment between the run channel 114 and the door structure 112.

As noted above, the door structure surfaces face exteriorly to the run channel 114. As explained in additional detail below, the door structure 112 may include a number of features projecting interiorly to the door structure 112. In general, the features and the door structure surfaces are complementary to one another. Accordingly, together with the door structure surfaces, the features generally promote the integrity of the seals with the door structure 112.

However, for a particular feature, door structure surface, and seal with the door structure 112, the run channel 114 may, as shown, include a wear spot 120 on the door structure surface opposite the feature. The feature, the door structure surface, or both may create the wear spot 120 as the product of interference with one another. With the feature, as part of the door structure 112, being rigid, and the wear spot 120, as part of the run channel 114, being flexible, the feature might, over the life of the vehicle, mar, tear, cut, or otherwise wear the wear spot 120, thus raising the prospect of compromising the integrity of the seal with the door structure 112. For example, the feature might wear the wear spot 120 as the product of slight but repeated rubbing between the door structure 112 and the run channel 114 when the vehicle drives along rough ground and/or when the window 104 is moved between the closed position and the open position.

In relation to the wear spot 120, the run channel 114 is part of an assembly that, in addition to the run channel 114 itself, includes adhesive wear tape 122 applied to the wear spot 120. As shown, the adhesive wear tape 122 includes a semi-rigid backing 124. From between the feature and the wear spot 120, the backing 124 is configured to shield the wear spot 120 from wear by the feature, thus eliminating the prospect of the feature compromising the integrity of the seal with the door structure 112.

In the illustrated configuration of the window frame 110, the door structure 112 includes two upright sides 130, a horizontal header 132 above the sides 130, and two upright corners 134 between the sides 130 and the header 132. As shown, the sides 130 include a first side 130A and a second side 130B. Correspondingly, the corners 134 include a first corner 134A between the first side 130A and the header 132 and a second corner 134B between the second side 130B and the header 132. The sides 130, the corners 134, and the header 132 join one another end-to-end as continuous parts of the door structure 112. The sides 130 extend from the beltline 108 as continuous upward extensions of the main body 106. The sides 130 are longitudinally spaced apart from one another, with the first side 130A rearward of the second side 130B. The header 132 extends longitudinally between the sides 130. The corners 134 are longitudinally spaced apart from one another, with the first corner 134A rearward of the second corner 134B. The mounting channel 116 includes two upright side portions 136 oriented with and extending along the sides 130, and a horizontal header portion 138 oriented with and extending along the header 132. As shown, with the sides 130 including the first side 130A and the second side 130B, the side portions 136 include a first side portion 136A and a second side portion 136B.

As part of the main body 106 and the window frame 110, the door structure 112 includes an upright sheet metal inner door panel 142 and an upright sheet metal outer door panel 144. Moreover, as part of the window frame 110, the door structure 112 includes an upright applique 146 on the outer door panel 144. As shown, the applique 146 extends along the first side 130A and is mounted to the outer door panel 144.

Both the outside edge areas of the inner door panel 142 and the outer door panel 144, to the outside of the window frame 110, and the inside edge areas of the inner door panel 142 and the outer door panel 144, to the inside of the window frame 110, are hemmed together, welded together, or otherwise rigidly secured with one another. To the inside of the window frame 110, the inside edge areas are laterally backed against one another along the first side 130A, laterally spaced apart from one another along the second side 130B, and laterally spaced apart from one another along the header 132. Along the first side 130A, the inside edge areas are secured together, and, with the applique 146 mounted to the outer door panel 144, the first side portion 136A is formed on the backside of the applique 146. Along the second side 130B, the inside edge areas are secured with one another about the second side portion 136B. Similarly, along the header 132, the inside edge areas are secured with one another about the header portion 138.

Similar to the door structure 112, the run channel 114, in profile, includes two upright side sections 150, a horizontal header section 152 above the side sections 150, and two upright corner sections 154 between the side sections 150 and the header section 152. The side sections 150 extend along and are mounted to the sides 130 within the side portions 136, the header section 152 extends along and is mounted to the header 132 within header portion 138, and the corner sections 154 extend along and are mounted to the corners 134. As shown, the side sections 150 include a first side section 150A and a second side section 150B. Correspondingly, the corner sections 154 include a first corner section 154A between the first side section 150A and the header section 152 and a second corner section 154B between the second side section 150B and the header section 152. The side sections 150, the corner sections 154, and the header section 152 are joined with one another end-to-end as continuous parts of the run channel 114. The side sections 150 extend from within the main body 106 past the beltline 108. The side sections 150 are longitudinally spaced apart from one another, with the first side section 150A rearward of the second side section 150B. The header section 152 extends longitudinally between the side sections 150. The corner sections 154 are longitudinally spaced apart from one another, with the first corner section 154A rearward of the second corner section 154B.

As part of the side sections 150, the corner sections 154, and the header section 152, the run channel 114, in cross-section, includes a base 160, an inner leg 162 and an outer leg 164, an inner sealing lip 166 and an outer sealing lip 168, and an inner molding lip 170 and an outer sealing bead 172. The base 160, the inner leg 162 and the outer leg 164, the inner sealing lip 166 and the outer sealing lip 168, and the inner molding lip 170 and the outer sealing bead 172 extend along the run channel 114. The base 160 and the window opening 102, and the inner leg 162 and the outer leg 164, are opposed with one another about the run channel 114, with the base 160 extending between the inner leg 162 and the outer leg 164. The inner leg 162 and the outer leg 164 are opposed with one another about the base 160, and extend from the base 160 toward the window opening 102. The inner sealing lip 166 and the outer sealing lip 168 are opposed with one another, and extend from the inner leg 162 and the outer leg 164 interiorly to the run channel 114. As shown, the inner sealing lip 166 and the outer sealing lip 168 extend distally from the inner leg 162 and the outer leg 164 back away from the window opening 102. The inner molding lip 170 and the outer sealing bead 172 are opposed with one another, and extend from the inner leg 162 and the outer leg 164 exteriorly to the run channel 114. As shown, the inner molding lip 170 and the outer sealing bead 172 extend distally from the inner leg 162 and the outer leg 164, with the inner molding lip 170 extending back away from the window opening 102.

As noted above, the window surfaces face interiorly to the run channel 114 toward the periphery of the window 104, and the door structure surfaces face exteriorly to the run channel 114 toward the door structure 112. For example, the run channel 114 includes the window surfaces on the base 160, and, most notably, the inner sealing lip 166 and the outer sealing lip 168. For example, the run channel 114 includes the door structure surfaces on the base 160, the inner leg 162 and the outer leg 164, and the inner molding lip 170 and the outer sealing bead 172.

Figure 2A:
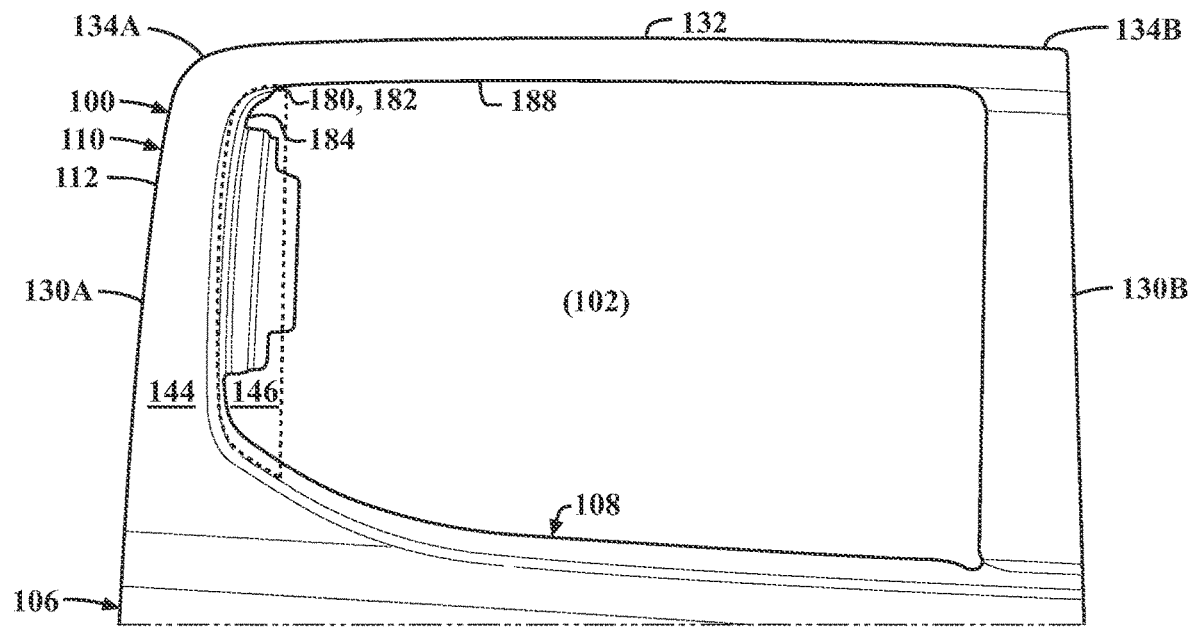
FIGS. 2A and 2B are a side view and a detailed perspective view of the door structure, showing, among other things, an edge feature associated with an inside edge area of the outer door panel, opposite of which the first corner section includes the wear spot on the outer leg facing exteriorly to the first corner section.
Figure 2B:
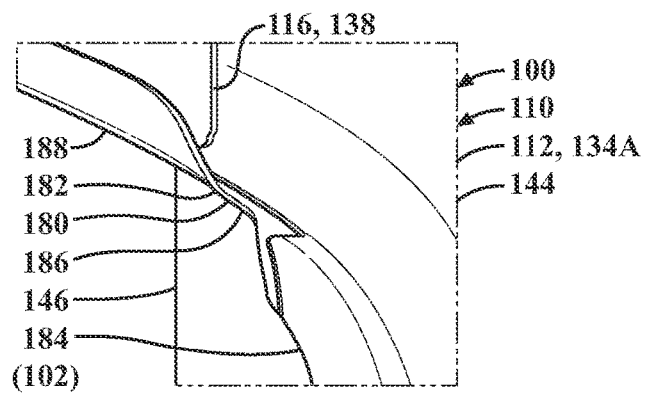
Figure 3A:
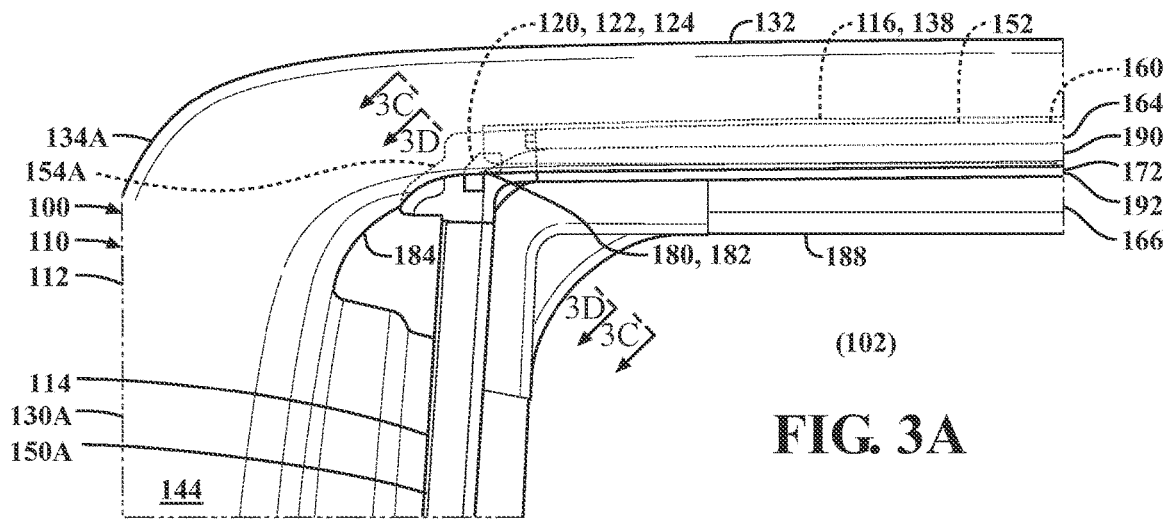
FIG. 3A is a detailed side view of the window frame with the applique removed for better viewing, showing further aspects of the edge feature and the wear spot, and aspects of the adhesive wear tape, including a backing configured to shield the wear spot from wear by the edge feature.
Figure 3B:
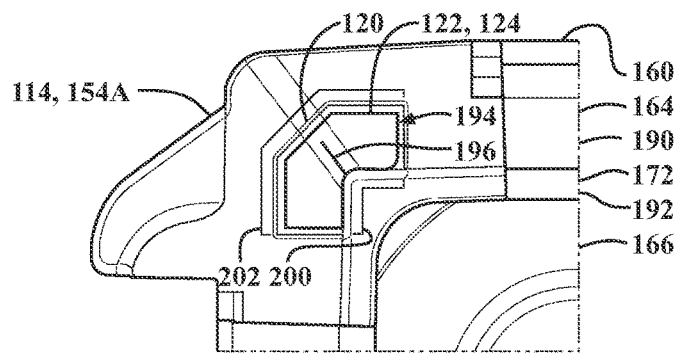
FIG. 3B is a detailed side view of the first corner section, showing further aspects of the wear spot, including a recess for accommodating the adhesive wear tape, and further aspects of the adhesive wear tape, including the backing being configured to flexibly adopt a contour of the wear spot and the recess.
Figure 3C:
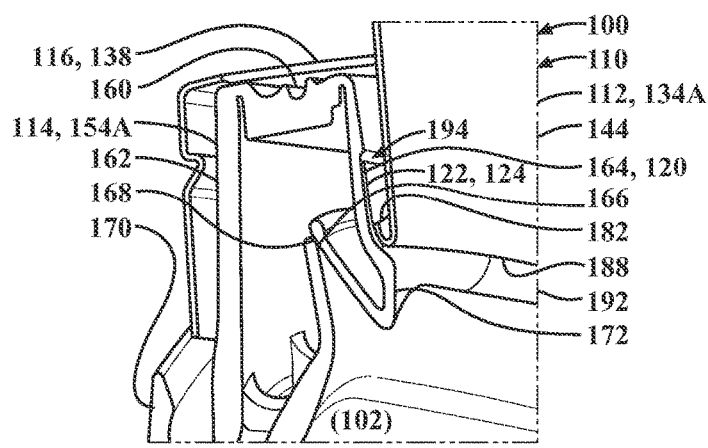
FIGS. 3C and 3D are cross-sectional views of the window frame taken along the lines 3C-3C and 3D-3D in FIG. 3A, showing aspects of the backing shielding the wear spot from wear by the edge feature.
Figure 3D:
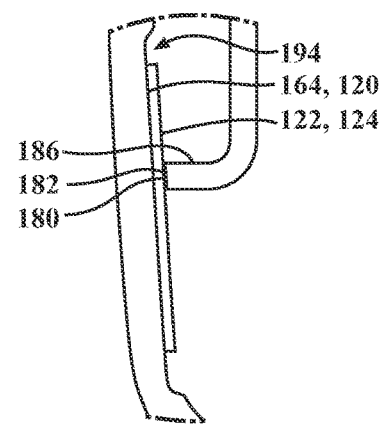

As shown with additional reference to FIGS. 2A and 2B, in the illustrated configuration of the window frame 110, the first corner section 154A includes the wear spot 120 on a door structure surface on the outer leg 164 opposite an edge feature 180 associated with the inside edge area of the outer door panel 144. As shown, the outer door panel 144 includes an inside edge 182 leading from the inside edge area. In association with the applique 146 and the header portion 138, the inside edge area has a compound geometry along the first corner 134A, where the first side 130A and the header 132 join one another. As part of the compound geometry, the inside edge area includes an offset 184 for the applique 146, a flange 186, and a hem 188 for the header portion 138. The offset 184 leads from the first side 130A, the hem 188 leads to the header 132, and the flange 186 is between the offset 184 and the hem 188 at the first corner 134A. The offset 184, the flange 186, and the hem 188 project from the outer door panel 144 interiorly to the door structure 112. As part of the door structure 112, the applique 146 is backed against the offset 184, and the header portion 138 is cinched within the hem 188. The flange 186 serves to continuously transition the offset 184 and the hem 188 between one another. The inside edge 182 extends continuously along the offset 184, the flange 186, and the hem 188, and includes the edge feature 180 along the flange 186.

As shown with additional reference to FIGS. 3A, 3B, 3C, and 3D, the outer sealing bead 172 divides the outer leg 164 into an outside portion 190 within the door structure 112 and an inside portion 192 exposed from the door structure 112. The outer sealing bead 172 and the applique 146 and the hem 188 are complementary to one another. At the inside portion 192, along the first corner 134A and the first corner section 154A, the outer sealing bead 172 continuously abuts the applique 146 leading from the first side 130A and the first side section 150A and the hem 188 leading to the header 132 and the header section 152. As shown, the wear spot 120 is on the outside portion 190. At the outside portion 190, with the flange 186 projecting interiorly to the door structure 112, the edge feature 180 faces interiorly to the door structure 112. Moreover, from its location on the door structure surface on the outer leg 164, the wear spot 120 faces exteriorly to the corner section 154, and is opposite the edge feature 180. The edge feature 180, the outer leg 164, or both may create the wear spot 120 as the product of interference with one another. With the edge feature 180, as part of the outer door panel 144, being made from sheet metal, it is contemplated that the edge feature 180 might, over the life of the vehicle, wear the wear spot 120. More specifically, it is contemplated that the edge feature 180 might tear and/or cut the wear spot 120. With the adhesive wear tape 122 applied to the wear spot 120, the backing 124 is configured to shield the wear spot 120 from wear by the edge feature 180, including preventing the edge feature 180 from tearing and/or cutting the wear spot 120.

In general, the window frame 110 is subject to design constraints concerning the shape and size of the door structure 112, the shape and size of the first corner section 154A, and the lateral (as referred to as "cross-vehicle") position of the window 104. Among other things, at the outside portion 190 and elsewhere, the first corner section 154A is subject to design constraints concerning the shape and size of the outer leg 164. For example, it is generally not feasible to increase the thickness of the outer leg 164. As shown, the wear spot 120 includes a recess 194 for accommodating the adhesive wear tape 122, and the adhesive wear tape 122 is applied within the recess 194. In addition to accommodating the adhesive wear tape 122, the recess 194 reduces interference between the edge feature 180 and the outer leg 164. For purposes of the recess 194 accommodating the adhesive wear tape 122, the backing 124 is relatively thin. More specifically, the backing 124 is approximately 0.3 mm thick. With the recess 194 accommodating the adhesive wear tape 122, the adhesive wear tape 122 may be advantageously applied to the wear spot 120 in a design-friendly manner with respect to design constraints concerning the shape and size of the outer leg 164.

Moreover, the recess 194 and the adhesive wear tape 122 have a shared geometry. As explained in additional detail below, with the first corner section 154A having a molded construction, the recess 194 is molded into the wear spot 120, and the adhesive wear tape 122 is cut to shape from a blank. With the recess 194 and the adhesive wear tape 122 having a shared geometry, the adhesive wear tape 122 may be advantageously applied to the wear spot 120 in a user-friendly and error-proof manner.

In the as-molded condition, the wear spot 120, and the recess 194, as part of the wear spot 120, include a contour, or, in other words, are nonplanar. Moreover, with the wear spot 120 and the recess 194, as part of the first corner section 154A, being flexible, the contour is configured to change when the first corner section 154A flexes. For example, the first corner section 154A may flex during handling of the run channel 114, including packaging for transport and mounting to the door structure 112. Despite being semi-rigid, the backing 124 is configured to flexibly adopt the contour both when the adhesive wear tape 122 is applied to the wear spot 120 and when the contour changes. As shown, the backing 124 includes a hinge 196 about which the backing 124 is configured to flex, and the backing 124 is configured to flexibly adopt the contour by flexing about the hinge 196. With the backing 124 configured to flexibly adopt the contour, in addition to ensuring initial securement when the adhesive wear tape 122 is applied to the wear spot 120, the backing 124 will remain secured when the contour changes. Accordingly, the adhesive wear tape 122 may be advantageously applied to the wear spot 120 in a reliable manner.

In the illustrated configuration of the wear spot 120 and the recess 194, the contour is convex and has a peak extending diagonally to the first corner section 154A, and the backing 124 is configured to flexibly adopt the peak by flexing about the hinge 196. As noted above, the recess 194 and the adhesive wear tape 122 have a shared geometry. In general, the geometry is tailored to the edge feature 180 to minimize the footprint of the adhesive wear tape 122. For example, the recess 194 and the adhesive wear tape 122 have a less than 24 mm by 24 mm bounding box. More specifically, the recess 194 and the adhesive wear tape 122 have an approximately 12 mm by 12 mm bounding box. Moreover, the geometry is tailored to configuring the backing 124 to flexibly adopt the peak. As shown, the recess 194 and the adhesive wear tape 122 have an L-shape oriented diagonally to the first corner section 154A, and the L-shape includes a diagonal oriented with the peak. Correspondingly, the hinge 196 extends along the diagonal. More specifically, the hinge 196 is formed as a slit through the backing 124 extending partway along the diagonal.

As shown, the L-shape, in profile, includes an orthogonal (i.e., two-sided) inside angle 200 bisected by the diagonal, to the inside of the first corner section 154A, and a chamfered (i.e., three-sided) outside angle 202 bisected by the diagonal, to the outside of the first corner section 154A. In addition to horizontal and upright connecting sides, the L-shape includes upright and horizontal inside sides, as part of the orthogonal inside angle 200, and opposing upright, cross-diagonal (i.e., across the diagonal), and horizontal outside sides, as part of the chamfered outside angle 202. The diagonal extends approximately 5 mm between the orthogonal inside angle 200 and the cross-diagonal outside side, and the slit extends approximately 4 mm between the orthogonal inside angle 200 and the cross-diagonal outside side. With the L-shape including the chamfered outside angle 202, the adhesive wear tape 122 may be advantageously cut to shape from a blank in a more cost-effective manner compared an otherwise similar L-shape with an orthogonal outside angle. Moreover, in furtherance of the recess 194 and the adhesive wear tape 122 having a shared geometry, the adhesive wear tape 122 may be advantageously applied to the wear spot 120 in a user-friendly and error-proof manner by aligning, among other sides, the cross-diagonal outside side of the adhesive wear tape 122 with the cross-diagonal outside side of the recess 194.

The assembly of the run channel 114 includes a primary process of molding the first corner section 154A and otherwise forming the run channel 114 and a secondary process of applying the adhesive wear tape 122 to the wear spot 120 after molding the first corner section 154A and otherwise forming the run channel 114. Applying the adhesive wear tape 122 to the wear spot 120 as part of the secondary process is advantageously not only more cost-effective, but also more design-friendly with respect to design constraints concerning the shape and size of the outer leg 164, than over molding a metallic wear element or insert molding a polymeric wear element with the first corner section 154A as part of the primary process.

In association with the primary process, the side sections 150 and the header section 152 have extruded constructions, and the corner sections 154 have molded constructions. The side sections 150, the corner sections 154, and the header section 152 are made from one or more flexible, durable, supportive, and seal-making polymeric materials suitable for extrusion and molding, such as thermoplastic vulcanizate (TPV). As part of the primary process, the side sections 150 and the header section 152 are extruded, cut to length, and trimmed at their ends to form joints with the corner sections 154. The corner sections 154 are then molded. More specifically, the corner sections 154 are over molded with the side sections 150 and the header section 152 using an injection molding process. In relation to the secondary process, as part of molding the first corner section 154A, the recess 194 is molded into the wear spot 120. In addition to forming the corner sections 154, the side sections 150, the corner sections 154, and the header section 152 are thereby joined with one another end-to-end as continuous parts of the run channel 114. With the run channel 114 thereby formed, the corner sections 154 are then demolded, thereby freeing the run channel 114 for further processing.

In association with the secondary process, the adhesive wear tape 122 is cut to shape from a blank including the backing 124, an adhesive, and a release liner. The backing 124 is made from one or more semi-rigid, durable, and wear-resistant polymeric materials suitable for shielding the wear spot 120 from wear by the edge feature 180, such as ultrahigh molecular weight polyethylene (UHMWPE). The adhesive is made from one or more adherent, pressure-sensitive polymeric materials suitable for securing the backing 124 to the wear spot 120, such as acrylic. As part of the secondary process, the release liner is removed, and an adhesive promoter is applied to the wear spot 120. The adhesive wear tape 122 is then applied to the wear spot 120 under pressure. More specifically, the adhesive promoter and the adhesive wear tape 122 are applied within the recess 194 molded into the wear spot 120 during the primary process. With the adhesive wear tape 122 applied to the wear spot 120, the adhesive bonds between the backing 124 and the wear spot 120, thereby securing the backing 124 to the wear spot 120.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A run channel for a vehicular door, comprising:
   a corner section, the corner section including window surfaces facing interiorly to the corner section, door structure surfaces facing exteriorly to the corner section, and a wear spot on a one of the door structure surfaces; and
   adhesive wear tape applied to the wear spot, the adhesive wear tape including a backing configured to shield the wear spot from wear, and an adhesive securing the backing to the wear spot.

2. The run channel of claim 1, wherein:
   the wear spot includes a recess; and
   the adhesive wear tape is applied within the recess.

3. The run channel of claim 1, wherein:
   the corner section has a molded construction, and includes a recess molded into the wear spot; and
   the adhesive wear tape is applied within the recess.

4. The run channel of claim 1, wherein:
   the wear spot includes a contour; and
   the backing is configured to flexibly adopt the contour.

5. The run channel of claim 1, wherein:
   the wear spot includes a contour; and
   the backing includes a hinge about which the backing is configured to flex, and is configured to flexibly adopt the contour by flexing about the hinge.

6. The run channel of claim 1, wherein:
   the wear spot includes a recess, the recess including a contour;
   the adhesive wear tape is applied within the recess; and
   the backing includes a hinge about which the backing is configured to flex, and is configured to flexibly adopt the contour by flexing about the hinge.

7. A method of assembling a run channel for a vehicular door, comprising:
   molding a corner section, the corner section including window surfaces facing interiorly to the corner section, door structure surfaces facing exteriorly to the corner section, and a wear spot on one of the door structure surfaces; and
   after molding the corner section, applying adhesive wear tape to the wear spot, the adhesive wear tape including a backing configured to shield the wear spot from wear, and an adhesive securing the backing to the wear spot.

8. The method of claim 7, wherein:
   molding the corner section includes molding a recess into the wear spot; and
   applying the adhesive wear tape includes applying the adhesive wear tape within the recess.

9. The method of claim 7, wherein:
   molding the corner section includes molding a recess into the wear spot, the recess including a contour;
   applying the adhesive wear tape includes applying the adhesive wear tape within the recess; and
   the backing includes a hinge about which the backing is configured to flex, and is configured to flexibly adopt the contour by flexing about the hinge.

10. The method of claim 7, wherein molding the corner section includes over molding the corner section with a side section and a header section using an injection molding process, thereby joining the side section, the corner section, and the header section with one another end-to-end as continuous parts of a run channel.

11. A run channel for a vehicular door, comprising:
    a corner section, the corner section having a molded construction, and including a base, an inner leg and an outer leg extending from the base, an inner sealing lip and an outer sealing lip extending from the inner leg and the outer leg interiorly to the corner section, a wear spot on the outer leg facing exteriorly to the corner section, and a recess molded into the wear spot; and adhesive wear tape applied within the recess, the adhesive wear tape including a backing configured to shield the wear spot from wear, and an adhesive securing the backing to the wear spot.

12. The run channel of claim 11, wherein the corner section includes an outer sealing bead extending from the outer leg exteriorly to the corner section, the outer sealing bead dividing the outer leg into an outside portion and an inside portion, and the wear spot is on the outside portion.

13. The run channel of claim 11, wherein:
the recess includes a contour; and
the backing is configured to flexibly adopt the contour.

14. The run channel of claim 11, wherein:
the recess includes a contour; and
the backing includes a hinge about which the backing is configured to flex, and is configured to flexibly adopt the contour by flexing about the hinge.

15. The run channel of claim 11, wherein:
the recess includes a contour, the contour having a peak extending diagonally to the corner section; and
the backing includes a hinge about which the backing is configured to flex, and is configured to flexibly adopt the peak by flexing about the hinge.

16. The run channel of claim 11, wherein the recess and the adhesive wear tape have an L-shape oriented diagonally to the corner section.

17. The run channel of claim 11, wherein the recess and the adhesive wear tape have an L-shape oriented diagonally to the corner section, the L-shape including a diagonal, an orthogonal inside angle bisected by the diagonal, and a chamfered outside angle bisected by the diagonal, the chamfered outside angle including a cross-diagonal outside side.

18. The run channel of claim 11, wherein:
the recess includes a contour, the contour having a peak extending diagonally to the corner section;
the recess and the adhesive wear tape have an L-shape oriented diagonally to the corner section, the L-shape including a diagonal oriented with the peak; and
the backing includes a hinge formed as a slit through the backing extending partway along the diagonal about which the backing is configured to flex, and is configured to flexibly adopt the peak by flexing about the hinge.

19. The run channel of claim 11, wherein the recess and the adhesive wear tape have a less than 24 mm by 24 mm bounding box.

20. The run channel of claim 11, wherein the recess and the adhesive wear tape have an approximately 12 mm by 12 mm bounding box.

* * * * *